Patented Apr. 4, 1939

2,153,063

UNITED STATES PATENT OFFICE 2,153,063

PROCESS FOR THE RECOVERY OF NITROPARAFFINS

Homer Kieweg, Terre Haute, Ind., assignor to Commercial Solvents Corporation, Terre Haute, Ind., a corporation of Maryland No Drawing. Application February 3, 1938, Serial No. 188,514

10 Claims. (Cl. 260—644)

My invention relates to a process for the recovery of nitroparaffins from the gaseous reaction products of the vapor phase nitration of paraffin hydrocarbons.

The nitration of paraffin hydrocarbons, such as ethane, propane, butane, and the like, by means of nitric acid is most advantageously carried out in a continuous vapor phase process, as described in U. S. Patents 1,967,667 and 2,071,122 of H. B. Hass et al. In accordance with this process, nitric acid vapors and gaseous hydrocarbons, the latter preferably in molecular excess, are reacted in a heated reaction chamber to produce nitroparaffins. The gases leaving the reaction chamber contain hydrocarbons, water vapor, unreacted nitric acid and small amounts of certain other compounds, in addition to the nitroparaffins produced. The procedure previously recommended for recovering the nitroparaffins from these gases constituted simply passing the mixture through a condenser and recovering the nitroparaffins, together with some of the water vapor, by condensation. It is apparent, however, that the gases leaving such a condenser are saturated with nitroparaffins at the pressure and temperature involved, and when utilizing normal cooling water temperatures the recovery of nitroparaffins by this method alone is undesirably low for commercial operations.

Various methods have been proposed for recovering the residual nitroparaffins from the exit gases, but all of these methods have been undesirable from a commercial point of view. Refrigeration to increase the recovery by condensation is unduly expensive, and recovery by absorption on materials such as activated charcoal, or alumina gel, have been found to be disadvantageous from the standpoint of inducing side reactions of an undesirable nature, with resultant loss of nitroparaffins.

However, I have now discovered that the residual nitroparaffins in the exit gases may be satisfactorily absorbed on silica gel, and that in accordance with this procedure substantially complete recovery of the nitroparaffins can be easily and economically obtained. It is well known that silica gel preferentially absorbs water from solutions of organic compounds, but I have found that in spite of this fact relatively large amounts of nitroparaffins may be absorbed from the gases here involved, in addition to the absorption of a considerable amount of water. Thus, I have found that standard types of silica gel will absorb as much as 20% of their weight of nitroparaffins resulting from the nitration of propane, in addition to a substantially greater amount of water. My process is generally applicable to the recovery of nitroparaffins from the reaction products of the vapor phase nitration of paraffin hydrocarbons, but is especially adapted to the recovery of the more volatile nitroparaffins produced by the nitration of the low molecular weight paraffin hydrocarbons. Although all of the nitroparaffins in the exit gases from the nitration reaction may be recovered by absorption, for economic reasons I prefer to utilize my process in conjunction with the condensation process previously employed. In this manner the bulk of the nitroparaffins are recovered by condensation, and only the residual content of the exit gases need be recovered by absorption.

Any of the commonly available types of silica gel recommended for absorption purposes, may be employed in my process. Specially prepared, highly active, silica gels may be utilized if desired, but I have found that satisfactory recoveries can be made with the ordinary varieties of this material. The size of the silica gel particles is relatively unimportant in the operation of my process, but I prefer in general to employ a material of 5–20 mesh size, and preferably approximately 8–14 mesh. Material of larger sizes can be satisfactorily employed if grades are utilized which are sufficiently mechanically stable, and finer mesh material may be used if the resulting pressure drop in the apparatus is not undesirable.

My process may be carried out under any pressure conditions, either sub-atmospheric or super-atmospheric, and may thus be adapted to the particular pressure utilized in the nitration process. The temperature employed for the absorption step may likewise vary over a considerable range, although as in the case of other absorptions, low temperatures are to be preferred from the standpoint of efficiency. When employed in conjunction with a previous condensation step, the absorption step may suitably be effected at the temperature of the gases leaving the condenser.

The rate at which the gases are passed through the silica gel will depend, to some extent, upon the characteristics of the particular gel employed. In any particular case, analysis of the gases leaving the absorption chamber will readily demonstrate whether the rate is too high for complete absorption. Any rate of flow lower than the critical rate at which absorption is incomplete, or below the critical rate giving rise to undue agitation and mechanical disruption of the absorbent, may of course be employed; but for volumetric efficiency of the apparatus the rate should be as close to such critical value as possible. I have found that for the recovery of nitroparaffins from the nitration of propane, utilizing commonly available types of silica gel, a satisfactory space velocity for complete absorption of nitroparaffins from gases leaving a condenser cooled with water at approximately 15° C., is of the order of 200 cu. ft. of gas (0° C.; 760 m. m.) per cu. ft. of silica gel per hour. This rate has been found to have an adequate safety factor from the standpoint of complete absorption and to be satisfactory from the standpoint of the economies of apparatus volumetric efficiency. Somewhat different space velocities may be desired for other nitroparaffins, and preliminary tests will readily demonstrate the optimum rate in any given case.

The total absorptive capacity of the silica gel for the nitroparaffins will depend upon the activity of the particular gel employed, the nature of the nitroparaffins involved, and the water content of the gases from which the nitroparaffins are to be absorbed. In the case of higher nitroparaffins, of course greater amounts will be absorbed by the silica gel, and in the case of the lower molecular weight nitroparaffins, correspondingly smaller amounts will be absorbed. Excess water vapor in the gases will also tend to reduce the total amount of nitroparaffins absorbed. In general, I prefer to absorb approximately 10% of nitroparaffins, based on the weight of the silica gel, and then to substitute fresh silica gel for further absorption. However, analysis of the exit gases in any case will readily show the optimum time for substituting fresh silica gel for continued absorption.

My process may effectively be operated by employing two absorbers alternatively, the nitroparaffins being recovered from the silica gel in one, while the other is in use for absorption. The absorbed nitroparaffins may be recovered from the silica gel by any suitable procedure, as for example by passing steam through the material, or adding water and distilling off the nitroparaffins. In any such procedure the silica gel should be dried prior to reuse for absorption. This may be effected in any known manner and is advantageously carried out by passing air at 100° C. through the wet gel.

My invention may be illustrated by the following specific examples:

*Example I*

Exit gases from the nitration of propane with nitric acid under 40 lbs. pressure, were passed at the nitration pressure through a condenser cooled with water at approximately 15° C. to remove the bulk of the water vapor and nitroparaffins. The resulting gases were then passed at the same pressure through a silica gel absorber, containing silica gel of 8-14 mesh, having an apparent specific gravity of 30 lbs. per cu. ft. The gases were passed through the absorption unit at a space velocity of approximately 225 cu. ft. of gas per cu. ft. of silica gel per hour, for approximately 33 hours. Complete absorption was not obtained during the latter part of the run and the results obtained, therefore, signified maximum absorption of nitroparaffins by the silica gel, rather than maximum absorption for complete removal of nitroparaffins from the gases.

Half of the gel, treated as above described, was placed in a distillation apparatus, covered with water and heated until no more nitroparaffins distilled over. The nitroparaffins recovered in this manner constituted approximately 21% of the weight of the silica gel. The other portion of the silica gel was subjected to the action of steam at 100° C., until no more nitroparaffin was recoverable in the condensate. The nitroparaffins recovered in this manner likewise constituted approximately 21% of the weight of the silica gel.

*Example II*

Exit gases from the nitration of propane with nitric acid under 40 lbs. pressure, were passed at the same pressure through a condenser, as in Example I, and then through a silica gel absorber containing silica gel of the same characteristics utilized in Example I. The gases were passed through the absorber at 15–20° C. and a space velocity of approximately 193, for 14 hours. The exit gases from the absorber, at the end of this period, showing no nitroparaffins to be present. The silica gel, treated in this manner, was subjected to the action of steam at 100° C. to recover the absorbed nitroparaffins, which in this case amounted to approximately 10.7% of the weight of the silica gel.

It is to be understood, of course, that the above examples are illustrative only, and are not to be considered as limiting the scope of my invention. My invention is applicable to the recovery of nitroparaffins from the gaseous reaction products of the vapor phase nitration of paraffin hydrocarbons generally, and is not limited to treatment of the particular reaction products specified in the examples. My invention is particularly adapted to the recovery of the lower molecular weight nitroparaffins such as nitromethane, nitroethane, and the nitropropanes and nitrobutanes, which are difficult to recover efficiently by condensation, but my process is also applicable to the recovery of any of the higher molecular weight nitroparaffins. Likewise, as has been previously pointed out, the reaction conditions employed may be varied, depending upon the particular reaction products to be treated, and the process may be carried out either with or without the previous step of condensation. Numerous modifications and equivalents will of course appear to those skilled in the art, and it is to be understood that these are included within the scope of my invention.

My invention now having been described, what I claim is:

1. In the process for the recovery of lower nitroalkanes from the gaseous reaction products resulting from the vapor phase nitration of lower alkanes by the action of a nitrating agent chosen from the class consisting of nitric acid vapor and nitrogen dioxide on said lower alkanes at elevated temperatures, the step which comprises absorbing lower nitroalkanes contained in such gaseous reaction products by contacting said reaction products with silica gel.

2. In the process for the recovery of lower nitroalkanes from the gaseous reaction products resulting from the vapor phase nitration of ethane by the action of a nitrating agent chosen from the class consisting of nitric acid vapor and nitrogen dioxide on said ethane at elevated temperatures, the step which comprises absorbing lower nitroalkanes contained in such gaseous reaction products by contacting said reaction products with silica gel.

3. In the process for the recovery of lower nitroalkanes from the gaseous reaction products resulting from the vapor phase nitration of propane by the action of a nitrating agent chosen from the class consisting of nitric acid vapor and nitrogen dioxide on said propane at elevated temperatures, the step which comprises absorbing lower nitroalkanes contained in such gaseous reaction products by contacting said reaction products with silica gel.

4. In the process for the recovery of lower nitroalkanes from the gaseous reaction products resulting from the vapor phase nitration of butane by the action of a nitrating agent chosen from the class consisting of nitric acid vapor and nitrogen dioxide on said butane at elevated temperatures, the step which comprises absorbing lower nitroalkanes contained in such gaseous reaction products by contacting said reaction products with silica gel.

5. In the process for the recovery of lower nitroalkanes from the gaseous reaction products resulting from the vapor phase nitration of propane by the action of a nitrating agent chosen from the class consisting of nitric acid vapor and nitrogen dioxide on said propane at elevated temperatures, the step which comprises absorbing lower nitroalkanes contained in such gaseous reaction products by contacting said reaction products with silica gel at a space velocity of the order of 200 cu. ft. of gases per cu. ft. of silica gel per hour.

6. In a process for the recovery of nitro-alkanes from the gaseous reaction products resulting from the vapor phase nitration of lower alkanes by the action of a nitrating agent chosen from the class consisting of nitric acid vapor and nitrogen dioxide on said lower alkanes at elevated temperatures, the steps which comprise removing the bulk of the nitroparaffins and water vapor from said gases by condensation, and subsequently absorbing lower nitroalkanes contained in such gaseous reaction products by contacting said gases with silica gel.

7. In a process for the recovery of lower nitroalkanes from the gaseous reaction products resulting from the vapor phase nitration of ethane by the action of a nitrating agent chosen from the class consisting of nitric acid vapor and nitrogen dioxide on said ethane at elevated temperatures, the steps which comprise removing the bulk of the nitroparaffins and water vapor from said gases by condensation, and subsequently absorbing lower nitroalkanes contained in such gaseous reaction products by contacting said gases with silica gel.

8. In a process for the recovery of lower nitroalkanes from the gaseous reaction products resulting from the vapor phase nitration of propane by the action of a nitrating agent chosen from the class consisting of nitric acid vapor and nitrogen dioxide on said propane at elevated temperatures, the steps which comprise removing the bulk of the nitroparaffins and water vapor from said gases by condensation, and subsequently absorbing lower nitroalkanes contained in such gaseous reaction products by contacting said gases with silica gel.

9. In a process for the recovery of lower nitroalkanes from the gaseous reaction products resulting from the vapor phase nitration of butane by the action of a nitrating agent chosen from the class consisting of nitric acid vapor and nitrogen dioxide on said butane at elevated temperatures, the steps which comprise removing the bulk of the nitroparaffins and water vapor from said gases by condensation, and subsequently absorbing lower nitroalkanes contained in such gaseous reaction products by contacting said gases with silica gel.

10. In a process for the recovery of lower nitroalkanes from the gaseous reaction products resulting from the vapor phase nitration of propane by the action of a nitrating agent chosen from the class consisting of nitric acid vapor and nitrogen dioxide on said propane at elevated temperatures, the steps which comprise removing the bulk of the nitroparaffins and water vapor from said gases by condensation, and subsequently absorbing lower nitroalkanes contained in such gaseous reaction products by contacting said gases with silica gel at a space velocity of the order of 200 cu. ft. of gases per cu. ft. of silica gel per hour.

HOMER KIEWEG.